United States Patent [19]

Hino

[11] Patent Number: 5,051,575
[45] Date of Patent: Sep. 24, 1991

[54] OPTICAL SURFACE ROUGHNESS MEASURING APPARATUS USING DOUBLE-FOCUS LENS FOR PRODUCING PARALLEL AND CONVERGED BEAMS FOR MEASUREMENT

[75] Inventor: Motohito Hino, Nagoya, Japan

[73] Assignee: Brother Kogyo Kabushiki Kaisha, Japan

[21] Appl. No.: 518,432

[22] Filed: May 3, 1990

[30] Foreign Application Priority Data

May 16, 1989 [JP] Japan .............................. 1-56385[U]

[51] Int. Cl.$^5$ .......................... G02F 1/01; H01J 40/14
[52] U.S. Cl. .................................... 250/225; 250/571; 356/369; 359/494; 359/642
[58] Field of Search ................ 250/571, 225; 356/369; 350/411

[56] References Cited

PUBLICATIONS

Osipov, Binary Polarizing Lenses, Jan. 25, 1974, pp. 277–279.

Primary Examiner—David C. Nelms
Assistant Examiner—T. Davenport
Attorney, Agent, or Firm—Oliff & Berridge

[57] ABSTRACT

An optical surface roughness measuring apparatus for measuring roughness of a surface of a subject, by irradiating the surface with two linearly polarized beams of light which have orthogonal planes of polarization and different frequencies, and detecting a change in a beat frequency of the two beams reflected by the surface. The optical surface measuring apparatus includes a laser device for producing two linearly polarized laser beams as the two linearly polarized beams, and an optical device having a single optical path between the laser device and the surface of the subject, so that the two linearly polarized laser beams are propagated from the laser device toward the surface along the single optical path. The optical device includes a double-focus lens, and is operable for converging one of the two laser beams so as to irradiate a reading spot on the surface of the subject, and converting the other of the two laser beams into parallel ray of light for irradiating an area on the surface, the area being aligned with the reading spot and having a diameter larger than the reading spot.

14 Claims, 4 Drawing Sheets

OPTICAL SURFACE ROUGHNESS MEASURING APPARATUS USING DOUBLE-FOCUS LENS FOR PRODUCING PARALLEL AND CONVERGED BEAMS FOR MEASUREMENT

BACKGROUND OF THE INVENTION

1. Field of the Invention

The present invention relates in general to a surface roughness measuring apparatus, and more particularly to an optical apparatus which utilizes optical interference of two linearly polarized beams for measuring the roughness of a surface of a subject.

2. Discussion of the Related Art

In one type of a known optical surface roughness measuring apparatus, a surface of the subject to be measured is irradiated with two linearly polarized beams of light which have orthogonal planes of polarization and different frequencies. Described more particularly, one of the two linearly polarized beams is converged at an extremely small area of reading spot on the subject surface, while the other linearly polarized beam is converted into parallel rays of light with which a relatively large area including the reading spot on the subject surface is irradiated. The above-indicated one linearly polarized converged beam reflected by the extremely small reading spot serves as a measuring beam, while the other linearly polarized parallel beam reflected by the large area serves as a reference beam. These measuring and reference beams reflected by the subject surface interfere with each other to thereby produce a measuring beat signal which corresponds to the roughness of the subject surface. The known optical surface roughness measuring apparatus is adapted to measure the roughness of the surface of the subject, based on a phase shift or a frequency shift of the measuring beat signal. An example of the above-type of the surface roughness measuring apparatus is disclosed in U.S. Pat. No. 4,905,311 owned by the assignee of the present application. The apparatus disclosed in this patent was developed by the present assignee, but was not known at the time the present invention was made.

In the optical surface roughness measuring apparatus of the type described above, one of the two linearly polarized beams serving as the measuring beam is converged at the extremely small reading spot on the subject surface, while the other linearly polarized beam serving as the reference beam is converted into parallel rays of light for irradiating the comparatively large area around the reading spot. In operation, as the subject is moved relative to the measuring apparatus in a direction perpendicular to the direction of incidence of the measuring and reference beams, the length of an optical path of the measuring beam varies depending on degrees of minute projections and indentations of the surface of the subject, thereby causing changes in the phase or frequency of the measuring beam. On the other hand, the reference beam in the form of parallel rays applied to the comparatively large area of the subject surface does not undergo such a phase or frequency shift due to the roughness of the subject surface, since the amounts of influence of the projections and indentations in the large area on the reflected reference beam are averaged or counterbalanced with each other.

By combining the reflected measuring and reference beams, there is obtained a measuring beat signal having a beat frequency, which varies with the phase or frequency shift of the measuring beam due to the roughness of the subject surface. Thus, the optical surface roughness measuring apparatus is capable of measuring the surface roughness of the subject based on changes in the beat frequency of the measuring beat signal. It is to be noted that since the measuring and reference beams irradiating the subject surface are subject to vibrations or other disturbances during the movement of the subject, the influences of these vibrations or disturbances on the reflected measuring and reference beams are counterbalanced by each other, whereby the phase or frequency of the measuring beat signal is not affected or changed by these disturbances.

Referring to FIG. 3, an example of the above type of the optical surface roughness measuring device will be described in detail. In the figure, reference numeral 30 denotes a laser device in the form of a Zeeman-type laser source, which produces laser light L including two linearly polarized laser beams having orthogonal planes of polarization and slightly different frequencies. The two laser beams may consist of, for example, a P-type linearly polarized laser beam Lp having a frequency fp, and an S-type linearly polarized laser beam Ls having a frequency fs. The laser light L produced by the laser source 30 is split by a non-polarizing beam splitter 32. Namely, a half component of the laser light L is reflected by the non-polarizing beam splitter 32, and received and detected by a reference photosensor 34. This reference photosensor 34 produces a reference beat signal $F_B$ having a beat frequency $f_B(=|fs-fp|)$ of the frequencies of the received P-type and S-type laser beams.

The other component of the laser light L is transmitted through the non-polarizing beam splitter 34, and split by a polarizing beam splitter 36 into the P-type linearly polarized laser beam Lp and the S-type linearly polarized laser beam Ls. Described more specifically, the P-type polarized laser beam Lp is transmitted through the polarizing beam splitter 36, and is incident upon a convex lens 38. While the P-type polarized laser beam Lp passes through the convex lens 38 and another convex lens 40, the diameter of the laser beam Lp is increased. That is, a beam expander constituted by these convex lenses 38, 40 converts the P-type laser beam Lp into parallel rays of light having a circular cross sectional shape having an increased diameter. The P-type laser beam Lp transmitted through the lens 38 is reflected by a mirror 42 which is interposed between the two convex lenses 38, 40 so that the laser beam Lp reflected by the mirror 42 is propagated along the optical axis of an objective lens 44 which will be described.

On the other hand, the S-type linearly polarized laser beam Ls is reflected by the polarizing beam splitter 36, and then reflected by a mirror 46. While the S-type laser beam Ls reflected by the mirror 46 passes through a beam expander consisting of two convex lenses 48, 50, the diameter of the laser beam Ls is increased. Namely, the S-type laser beam Ls is converted by the beam expander into parallel rays of light having a circular cross sectional shape. The S-type laser beam Ls from the lens 48 is reflected by a polarizing beam splitter 52 which is interposed between the two convex lenses 48, 50 so that the laser beam Ls reflected by the beam splitter 52 is propagated along the optical axis of the objective lens 44. Thus, the parallel rays of the S-type laser beam Ls are propagated along the same optical axis as the parallel rays of the P-type laser beam Lp. The convex lenses 38, 40, 48, 50 are adapted such that the diameter of the S-type laser beam Ls transmitted through the convex lenses 48, 50 is smaller than that of the P-type laser beam Lp transmitted through the convex lenses 38, 40. The parallel P-type laser beam Lp transmitted through the convex lenses 38, 40 is then transmitted through the polarizing beam splitter 52, and is converged by the convex lens 50 at a given point on the optical axis of the objective lens 44.

The objective lens 44 is positioned such that its front focal point coincides with a rear focal point of the convex lens 50. Accordingly, the P-type linearly polarized laser beam Lp converged by the convex lens 50 is again converted into parallel rays by the objective lens 44 so that a comparatively large area on a surface 18 of a subject 12 is irradiated with the parallel rays of the P-type laser beam Lp. On the other hand, the S-type linearly polarized laser beam Ls which has been converted into parallel rays by the convex lenses 48, 50 is converged by the objective lens 44 at an extremely small reading spot on the surface 18 of the subject 12.

The subject 12 is mounted on an X-Y table 60 which is moved by a drive device 58 in two mutually perpendicular directions in an X-Y coordinate plane perpendicular to the optical axis of the objective lens 44. With the subject 12 being moved with the X-Y table 60, the frequency of the S-type linearly polarized laser beam Ls converged at each small reading spot on the surface 18 is subjected to a Doppler shift $\Delta fs$ which corresponds to a change in the height or level of the reading spot on the surface 18 of the subject 12, and a Doppler shift $\Delta fd$ caused by vibrations of the subject 12 and other disturbances during the X-Y movements of the X-Y table 60. Namely, the frequency of the reflected S-type laser beam Ls is equal to $(fs + \Delta fd + \Delta fs)$. Since the P-type linearly polarized laser beam Lp in the form of parallel rays is applied to the comparatively large area on the surface 18 of the subject 12, the amounts of influence of the minute projections and indentations in that area of the surface 18 on the frequency of the P-type laser beam Lp are averaged or counterbalanced with each other. Therefore, the frequency of the P-type laser beam Lp reflected by the surface 18 is subject to substantially no influence of the roughness of the surface 18 of the subject 12, and is influenced only by the disturbances which occur during the X-Y movements of the X-Y table 60. That is, the frequency of the reflected P-type laser beam Lp includes only a Doppler shift $\Delta fd$ due to the disturbances, and is equal to $(fp + \Delta fd)$. It will be understood that the S-type linearly polarized laser beam Ls irradiating the reading spot serves as a measuring beam, while the P-type linearly polarized laser beam Lp irradiating the relatively larea area on the surface 18 serves as a reference beam.

The P-type and S-type linearly polarized laser beams Lp, Ls which are reflected by the surface 18 of the subject 12 are propagated back to the polarizing beam splitter 36, in the reverse direction along the optical paths along which the beams Lp, Ls are incident upon the surface 18 as described above. The P-type and S-type laser beams Lp, Ls combined with each other by the beam splitter 36 are reflected by the non-polarizing beam splitter 32, and are received and detected by a measuring photosensor 62. This measuring photosensor 62 produces a measuring beat signal $F_D$ which corresponds to a beat caused by optical interference between the P-type and S-type polarized laser beams Lp, Ls. The measuring beat signal $F_D$ has a beat frequency $f_D$, which is equal to $|(fs + \Delta fd + \Delta fs) - (fp + \Delta fd)| = |fs - fp + \Delta fs|$, with the Doppler shifts $\Delta fd$ of the two beams Lp, Ls being counterbalanced with each other.

The measuring beat signal $F_D$ and the reference beat signal $F_B$ indicated above are applied to a detecting circuit 64. The detecting circuit 64 produces a beat signal indicative of the Doppler shift $\Delta fs$ due to the roughness of the surface 18 of the subject 12, which is obtained by subtracting the frequency $f_B(=|fs-fp|)$ of the reference beat signal $F_B$ from the frequency $f_D$ $(=|fs-fp+\Delta fs|)$ of the measuring beat signal $F_D$. The beat signal indicative of the Doppler shift $\Delta fs$ is applied to a control device 66 which is principally constituted by a microcomputer. The control device 66 is adapted to control the drive device 58 so as to successively move the X-Y table 60 in the X-axis and Y-axis directions, and calculate an amount of displacement Zs in the Z-axis or vertical direction at each reading spot on the surface 18 of the subject 12 during the X-Y movement of the X-Y table 60 (subject 12), according to the following equation (1), in response to the beat signal ($\Delta fs$) received from the detecting circuit 64. Based on the calculated amounts of vertical displacement Zs at the individual reading spots on the subject surface 18, the control device 66 commands a display 68 to provide a three-dimensional indication of the roughness of the surface 18 of the subject 12.

$$Zs = (\lambda/2) \int \Delta fs \, dt \qquad (1)$$

In the optical surface roughness apparatus as described above, the laser light L emitted by the laser source 30 is split by the polarizing beam splitter 36 into the S-type linearly polarized laser beam Ls and the P-type linearly polarized laser beam Lp, which function as the measuring beam and the reference beam, respectively. The measuring and reference laser beams Ls, Lp are propagated along respective optical paths until these laser beams Ls, Lp are incident upon the polarizing beam splitter 52 which guides the laser beams Ls, Lp along the same optical axis. Thereafter, the measuring and reference laser beams Ls, Lp are converted by the convex lens 50 and the objective lens 521 44 into the converged beam and parallel beam, respectively, which irradiate the comparatively small reading spot on the subject surface 18, and the comparatively large area aligned with the reading spot. Since the measuring beam Ls is incident upon the polarizing beam splitter 52 such that the optical axis of the measuring beam Ls is inclined by a given angle with respect to a reflecting surface of the beam splitter 52, an extinction ratio of the measuring beam Ls reflected by the polarizing beam splitter 52 is lowered, resulting in reduction in the signal component of the output of the measuring apparatus. Consequently, the surface roughness measuring apparatus suffers from an unfavorably lowered signal-to-noise (S/N) ratio. The lowering of the S/N ratio is also caused by noises which are included in the measuring and reference laser beams Ls, Lp due to streams of the atmosphere which occur differently in the above two optical paths of these laser beams Ls, Lp. Thus, the surface roughness measuring apparatus of FIG. 3 is not satisfactory in its measuring accuracy because of the low S/N ratio.

SUMMARY OF THE INVENTION

The present invention was developed in view of the above situations. It is therefore an object of the invention to provide an optical surface roughness measuring apparatus which has a sufficiently increased S/N ratio, and is capable of measuring roughness of a surface of a subject with high accuracy.

The above object may be achieved according to the principle of the present invention, which provides an optical surface roughness measuring apparatus for measuring roughness of a surface of a subject, by irradiating the surface with two linearly polarized beams of light which have orthogonal planes of polarization and different frequencies, and detecting a change in a beat frequency of the two beams reflected by the surface, comprising a laser device for producing two linearly polarized laser beams as the two linearly polarized beams, and an optical device having a single optical path between the laser device and the surface of the subject, so that the two linearly polarized laser beams are propagated from the laser device toward the surface along the single optical path. The optical device includes a double-focus lens, and is operable for converging one of the two laser beams so as to irradiate a reading spot on the surface of the subject, and converting the other of the two laser beams into parallel rays of light for irradiating an area on the surface, the area being aligned with the reading spot and having a diameter larger than the reading spot.

In the optical surface roughness measuring apparatus constructed as described above, the two linearly polarized laser beams having the orthogonal planes of polarization and different frequencies are produced by the laser device, and one of the two laser beams having a common optic axis is converted by the double-focus lens of the optical device into parallel rays of light, while the other laser beam is converged by the double-focus lens at a given point on the common optic axis. Consequently, one of the two linearly polarized laser beams emitted by the laser device is converged by the optical device, so as to irradiate the reading spot on the surface of the subject, and the other laser beam is converted into the parallel rays so as to irradiate the area which is aligned with and larger than the reading spot. The above-indicated one and the other laser beams which are reflected by the reading spot and the above-indicated area serve as a measuring beam and a reference beam, respectively. The above-indicated reference beam irradiating the relatively large area consists of the parallel rays of light. Accordingly, the diameter of the area irradiated with the reference beam is sufficiently greater than that of the reading spot. With the two laser beams reflected by the subject surface interfering with each other, there is obtained a measuring beat signal which undergoes a phase shift corresponding to a change in the relative surface height between the reading spot and the relatively large area. Thus, the roughness of the subject surface may be measured by detecting the amounts of changes in the frequency shift or phase shift of the measuring beat signal.

In the presence of the double-focus lens which is capable of converting the two laser beams having a common optic axis into the parallel beam and converged beam, respectively, the instant optical surface roughness measuring device permits the measuring and reference beams indicated above to be propagated along the same optical path, unlike the two beams in the arrangement of FIG. 3 in which the two laser beams are propagated along two different optical paths so as to provide a parallel beam and a converged beam. In other words, the optical device of the instant measuring apparatus is not required to split the laser light L emitted by the laser device into the two linearly polarized laser beams, and to combine the two laser beams reflected by the subject surface with each other. Accordingly, the instant surface roughness measuring apparatus is free from the problem of reduction in the extinction ratio due to splitting and combining of the laser beams, which would result in a reduced signal component of the output of the measuring apparatus. Thus, the instant measuring apparatus has a sufficiently increased signal-to-noise (S/N) ratio.

Further, since the two linearly polarized laser beams as the measuring and reference beams are propagated along the same optical path, these two beams are subject to similar influences due to streams of the atmosphere occurring in the same optical path. As a result, the measuring beat signal obtained from the measuring and reference beams does not involve noises due to the streams of the atmosphere, since the noises included in the two beams are counterbalanced with each other when the measuring beat signal is produced by interference between the two beams. Accordingly, the present surface roughness measuring apparatus has further improvements in the S/N ratio and its surface roughness measuring accuracy.

In one form of the present invention, the double-focus lens of the optical device comprises a concave lens formed of a birefringent material. In this case, the concave lens may be formed of uniaxial crystal.

The double-focus lens may further comprise a convex lens which is superposed on the concave lens in a direction parallel to the optical axis. In this case, the convex lens and the concave lens cooperate with each other to convert the two linearly polarized lazer beams into a parallel beam and a converged beam, respectively.

In one arrangement of the above form of the invention, the optical device further includes an objective lens disposed between the double-focus lens and the surface of the subject, for converging the parallel beam from the double-focus lens so as to irradiate the reading spot on the surface, and converting the converged beam from the double-focus lens into the parallel rays of light so as to irradiate the area on the surface.

In another form of the present invention, the double-focus lens consists of a pair of convex lenses, and a concave lens formed of a birefringent material, the concave lens having opposite concave surfaces on which the pair of convex lenses are disposed, respectively. In this case, the pair of convex lenses and the concave lens cooperate with each other to convert the two linearly polarized laser beams into a parallel beam and a converged beam, respectively.

In a further form of the present invention, the optical device further includes a beam expander disposed between the laser device and the double-focus lens, for converting the two laser beams into respective parallel beams which are incident upon the double-focus lens. In this case, the beam expander may comprise two convex lenses which are disposed on the single optical path.

The laser device may comprise a Zeeman-type laser source which produces two laser beams having orthogonal planes of polarization and different frequencies.

Alternatively, the laser device may comprise a laser source which produces a laser beam having a first frequency. In this case, the laser device includes an acoustooptic modulator for shifting the first frequency of the laser beam into a second frequency.

In a still another form of the present invention, the measuring apparatus further comprises: a reference photosensor receiving the two linearly polarized laser beams from the laser device, and producing a reference beat signal; a measuring photosensor receiving the two laser beams reflected by the reading spot and the area of the surface of the subject as a measuring and a reference beam, respectively, and producing a measuring beat signal; and a detecting circuit receiving the reference and measuring beat signals, and calculating the roughness of the subject based on the received beat signals.

In one arrangement of the above form of the invention, the detecting circuit calculates a first amount of displacement of the surface of the subject at the reading spot during a movement of the subject in a direction perpendicular to a direction of the displacement, based on a difference between counts of pulses of the reference and measuring beat signals. The first amount is measured in increments of a half of a wavelength of the frequencies of the laser beams. The detecting circuit further calculates a second amount of displacement of the surface during the movement, based on a count of clock pulses for a time duration corresponding to a phase difference between the reference and measuring beat signals. The second amount of displacement is measured in increments of not larger than the half of the wavelength. The detecting circuit is adapted to add the first and second amounts of displacement, and eventually determining the roughness of the surface of the subject, based on a sum of the first and second amounts. The subject may be moved in an X-Y plane, relative to the optical device, by an X-Y table on which the subject is mounted. In this case, the first and second displacements of the subject surface occur in a Z-axis direction perpendicular to the X-Y plane, as the subject is moved in the X-Y plane with the X-Y table.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
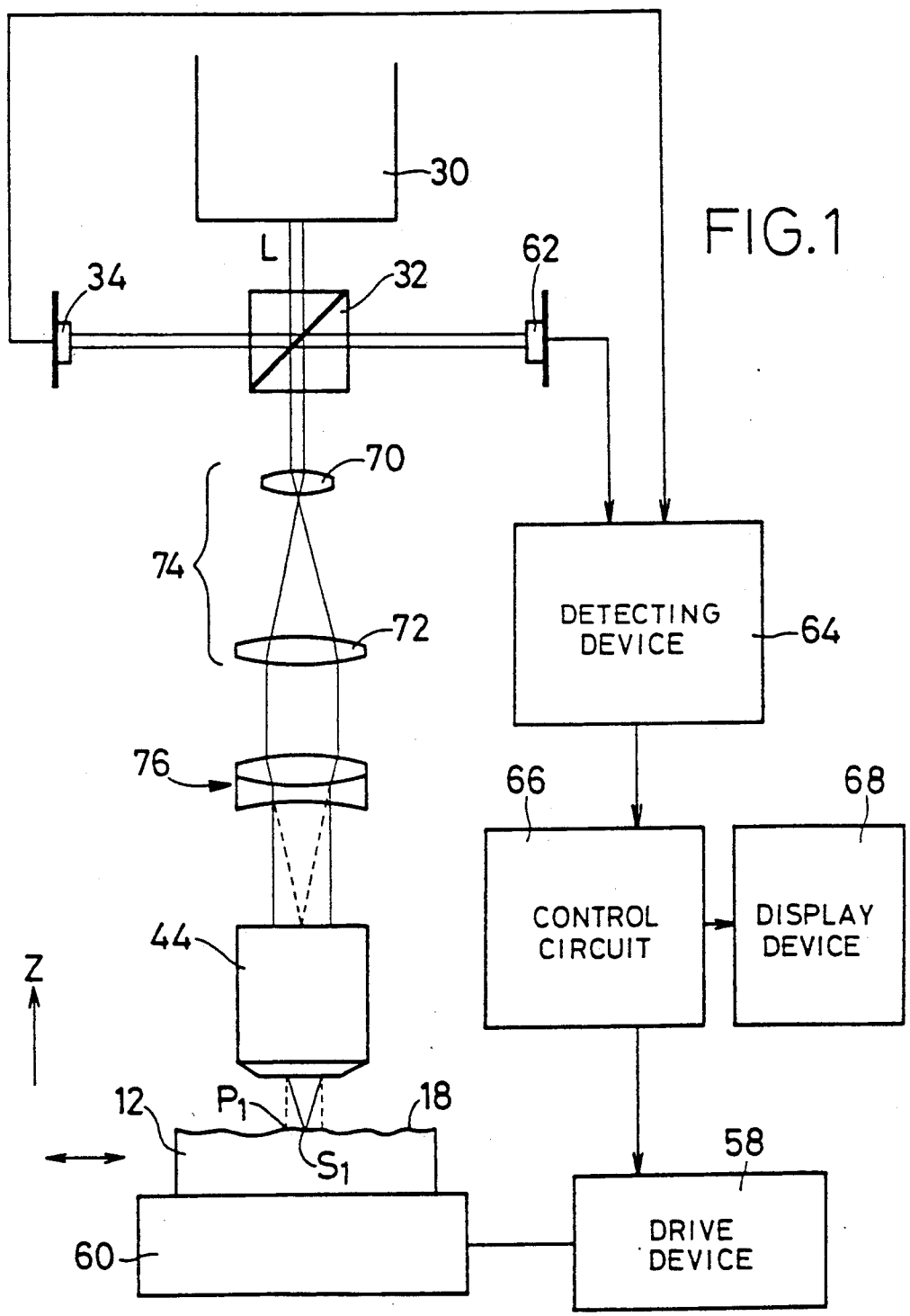
FIG. 1 is a schematic view of one embodiment of an optical surface roughness measuring apparatus of the present invention.
Figure 2:
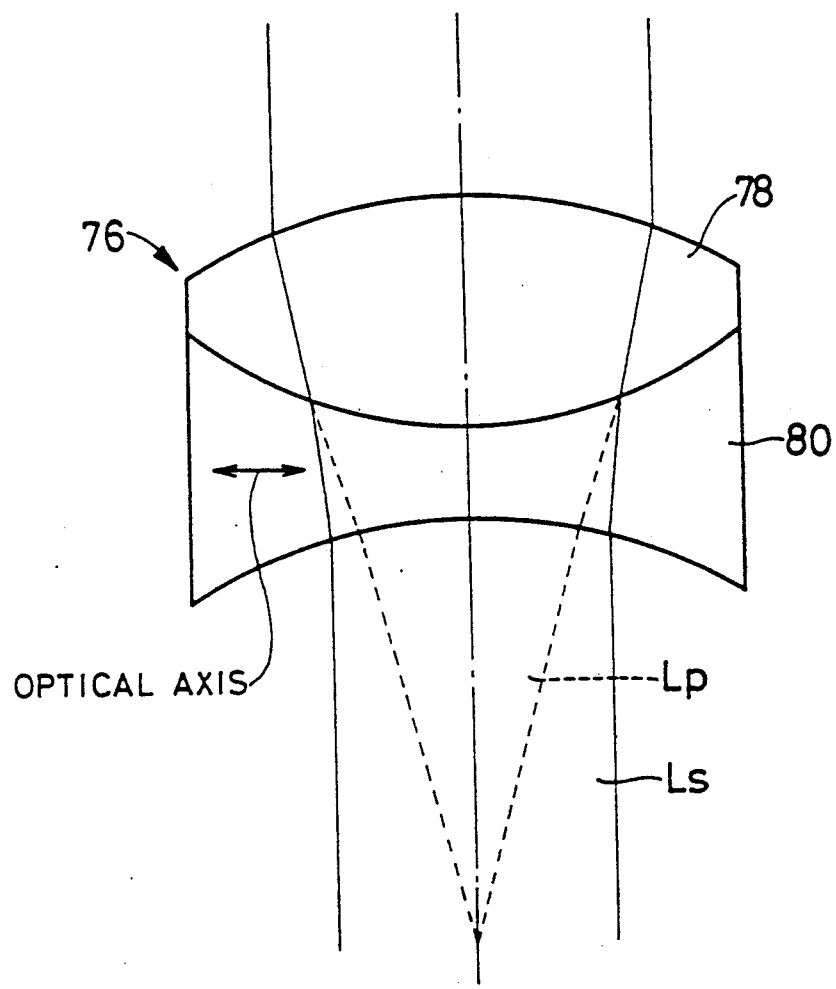
FIG. 2 is a view specifically illustrating a double-focus lens used in the measuring apparatus of FIG. 1.
Figure 3:
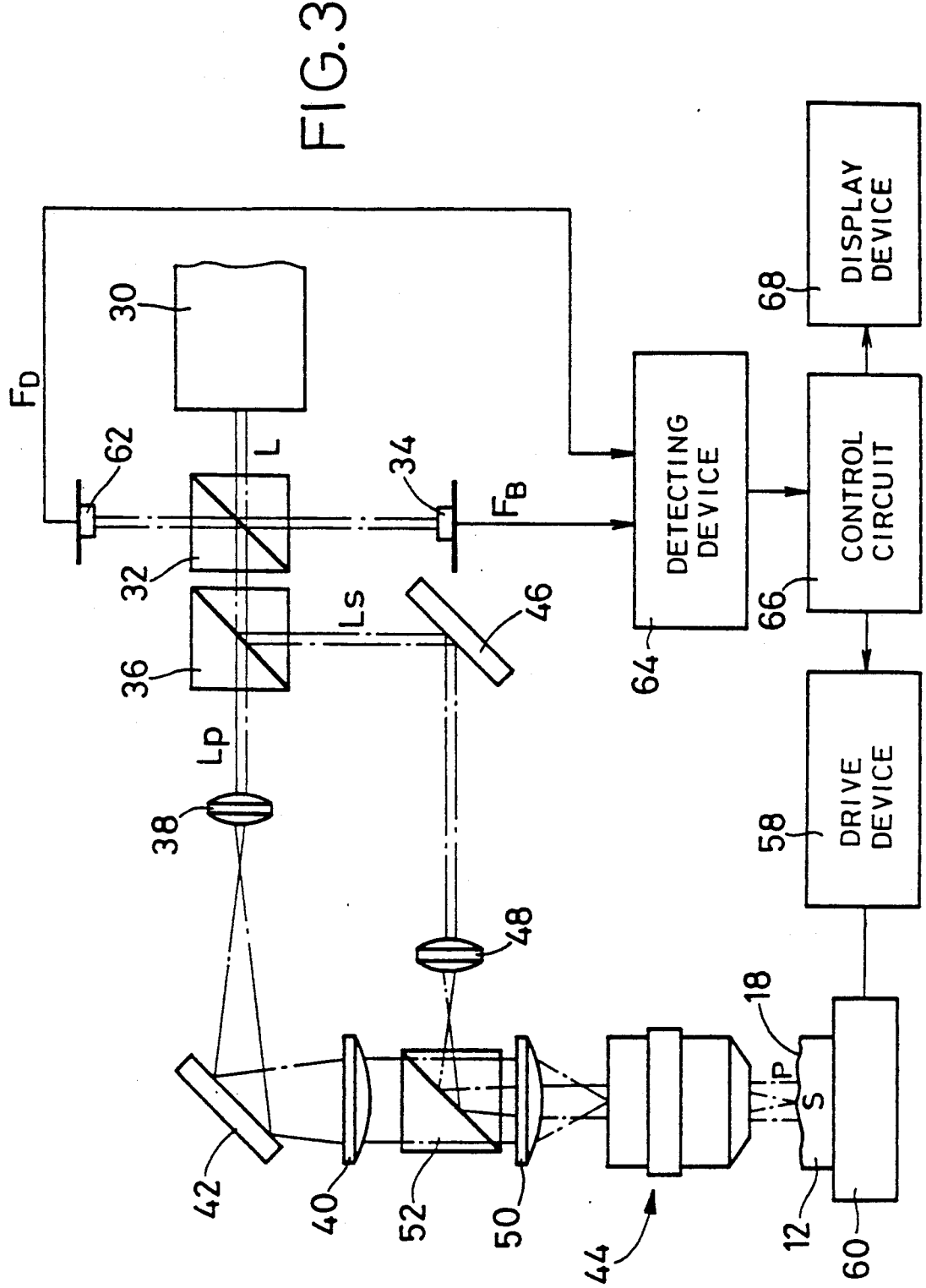
FIG. 3 is a schematic view of one example of an optical surface roughness measuring apparatus which was developed by the assignee of the present application, and against which the present invention provides an improvement.

Referring to FIGS. 1 and 2, there is illustrated a presently preferred embodiment of the present invention, which is an improvement over the optical surface roughness apparatus of FIG. 3. The same reference numerals as used in FIG. 3 will be used to identify functionally corresponding elements in the following description of the preferred embodiment, and no detailed description of those elements will be provided.

As shown in FIG. 1, the laser light L including the P-type linearly polarized laser beam Lp and the S-type linearly polarized laser beam Ls is emitted by the laser source 30, and a half of the laser light L is transmitted through the non-polarizing beam splitter 32. Then, the P-type and S-type laser beams Lp, Ls are transmitted through a beam expander 74 consisting of two convex lenses 70, 72 which are disposed in series on the same axis, so that the diameters of these laser beams Lp, Ls are increased by the beam expander 74. After the P-type and S-type laser beams Lp, Ls are converted by the beam expander 74 into respective parallel beams having a circular cross sectional shape, these laser beams Lp, Ls are incident upon a double-focus lens 76 which is disposed on the same axis as the convex lenses 70, 72 of the beam expander 74.

The double-focus lens 76 consists of a first lens 78 and a second lens 80 which are superposed on each other as specifically shown in FIG. 2. The first lens 78 is a convex lens which is formed of an optical glass, for example, while the second lens 80 is a concave lens which is formed of a birefringent material of uniaxial crystal, such as calcite or rock crystal. The birefringent material for the second lens 80 has a property that its refractive index varies with an angle formed by its optical axis and the plane of polarization of an incident light beam. The double-focus lens 76 is disposed such that the refractive index of the second lens 80 formed of the birefringent material is larger with respect to the S-type linearly polarized laser beam Ls than with respect to P-type laser beam Lp, and such that the optical axis of the second lens 80 is parallel to one of the polarization planes of the S-type and P-type linearly polarized laser beams Lp, Ls. The above-indicated one of the polarization planes of the S-type and P-type laser beams Ls, Lp parallel to the optical axis of the second lens 80 is determined depending upon whether the birefringent material for the second lens 80 is a positive uniaxial crystal or a negative uniaxial crystal.

The S-type and P-type linearly polarized laser beams Ls, Lp whose diameters have been expanded by the beam expander 74 are both converged to some extent by the first lens 78 of the double-focus lens 76 constructed as described above. Then, the S-type laser beam Ls is diverged by the second lens 80, and converted into parallel rays of light, while the P-type laser beam Lp is converged by the second lens 80, and focused to a given point on the common optical axis of the lenses 70, 72, 76. As described above with respect to the apparatus of FIG. 3, the objective lens 44 has a front focal point which coincides with a point of focus or final convergence of the P-type laser beam Lp, and a rear focal point which is located on the surface 18 of the subject 12. In this arrangement, the parallel S-type laser beam Ls is converged by the objective lens 44 at a point of convergence S1 on the surface 18 of the subject 12, while the converged P-type laser beam Lp is converted into parallel rays by the objective lens 44 so that an area P1 of the surface 18 around the above point of convergence S1 of the S-type laser beam Ls is irradiated with the parallel P-type laser beam Lp having an irradiation diameter considerably larger than that of the S-type laser beam Ls. Namely, a reading spot S1 on the surface 18 having an extremely small diameter is irradiated with the converged S-type laser beam Ls, and the comparatively large area P1 which is aligned with the reading spot S1 is irradiated with the parallel P-type laser beam Lp.

The S-type and P-type linearly polarized laser beams Ls, Lp which are reflected by the surface 18 of the subject 12 are propagated back to the non-polarizing beam splitter 32, in the reverse direction along the same optical path as described above, and reflected by the beam splitter 32 so that the reflected laser beams Ls, Lp are incident upon and received by the measuring photosensor 62.

As the subject 12 mounted on the X-Y table 60 is moved in the X-Y coordinate plane perpendicular to the optic axis of the objective lens 44, the frequency of the S-type linearly polarized laser beam Ls which is converged at the reading spot S1 on the surface 18 of the subject 12 is subjected to a Doppler shift $\Delta fs$ which corresponds to a degree of roughness (minute projections and indentations) of the surface 18, and a Doppler shift $\Delta fd$ caused by vibrations of the subject 12 and other disturbances due to the X-Y movements of the X-Y table 60. Namely, the frequency of the reflected S-type laser beam Ls is equal to $(fs + \Delta fd + \Delta fs)$, where fs represents the frequency of the beam Ls as produced by the laser source 30. Since the P-type linearly polarized laser beam Lp in the form of parallel rays irradiates the comparatively large area P1 on the surface 18 of the subject 12, the amounts of influence of the minute projections and indentations of the surface 18 on the frequency of the P-type laser beam Lp are averaged or counterbalanced with each other. Therefore, the frequency of the P-type laser beam Lp which is reflected by the surface 18 is subject to substantially no influence of the roughness of the surface 18 of the subject 12, and is influenced only by disturbances which occur during the X-Y movements of the X-Y table 60. That is, the frequency of the reflected P-type laser beam Lp is subjected to only a Doppler shift $\Delta fd$ due to the disturbances, and is equal to $(fp + \Delta fd)$, where fp represents the frequency of the beam Lp as produced by the laser source 30. It will be understood that the S-type linearly polarized laser beam Ls serves as a measuring beam, while the P-type linearly polarized laser beam Lp serves as a reference beam.

As described above with respect to the apparatus of FIG. 3, the measuring photosensor 62 which receives the S-type and P-type linearly polarized laser beams Ls, Lp reflected by the surface 18 of the subject 12 produces a measuring beat signal $F_D$ which corresponds to a beat caused by optical interference between the P-type and S-type laser beams Lp, Ls. The measuring beat signal $F_D$ has a beat frequency $f_D$, which is equal to $|(fs + \Delta fd + \Delta fs) - (fp + \Delta fd)| = |fs - fp + \Delta fs|$, with the Doppler shifts $\Delta fd$ of the two beams Lp, Ls being counterbalanced with each other.

In the optical surface roughness measuring apparatus of the present embodiment, the subject 12 mounted on the X-Y table 60 is moved in the two directions in the X-Y plane, so that the frequency of the S-type linearly polarized laser beam Ls which is converged at the reading spot S1 on the surface 18 includes not only the Doppler shift $\Delta fs$ caused by the level of the reading spot S1 on the surface 18, but also the Doppler shift $\Delta fd$ caused by the vibrations of the subject 12 and other disturbances due to the X-Y movements of the X-Y table 60. On the other hand, the frequency of the P-type linearly polarized laser beam Lp whose parallel rays are reflected by the comparatively large area P1 on the surface 18 includes only the Doppler shift $\Delta fd$ due to the disturbances, since the amounts of influence of the minute projections and indentations of the surface 18 on the frequency of the P-type laser beam Lp are averaged or counterbalanced with each other. Therefore, in the detecting circuit 64, the degrees of roughness of the surface 18 of the subject 12 are successively measured at the individual local reading spots S1 over the entire measuring range of the surface 18, according to the equation (1) indicated above, based on the reference beat signal $F_B$, and the measuring beat signal $F_D$ obtained by interference of the reflected measuring and reference beams Ls, Lp. The results of such measurement are indicated in a three-dimensional coordinate system on the display 68.

Where the degree of the surface roughness is equal to or larger than a half $(\lambda/2)$ of the wavelength $\lambda$ of the laser beams, an amount of displacement $\Delta Zs1$ of the subject surface 18 in the Z-axis or vertical direction at the reading spots S1 during movement of the subject 12 in the X-Y plane may be obtained according to the following equation (2), by counting a count $C_I$ of pulses of the measuring beat signal $F_D$ and a count $D_B$ of pulses of the reference beat signal $F_B$.

$$\Delta Zs1 = (\lambda/2)\Sigma(C_I - D_B) \qquad (2)$$

Where the degree of the surface roughness is smaller than the half $(\lambda/2)$ of the wavelength $\lambda$ of the laser beams, an amount of Z-axis displacement $\Delta Zs2$ of the surface 18 of the subject 12 at the reading spots S1 of the S-type laser beam Ls during movement of the subject 12 may be measured with a resolution or in increments of about $\lambda/2000$ resolution, by a clock counter which counts clock pulses of the measuring and reference beat signals $F_D$ and $F_B$, whose phase difference is in the neighborhood of 100 MHz. Namely, the beat frequency $\Delta fs$ indicated above is represented by the following equation (3), according to the basic formula of the Doppler effect:

$$\Delta fs = (2/\lambda) \cdot (\Delta Zs2/\Delta t) \qquad (3)$$

By integrating the equation (3), the amount of Z-axis displacement $\Delta Zs2$ at each reading spot S1 in the Z-axis direction may be obtained according to the following equation (4):

$$\Delta Zs2 = (\lambda/2) \int \Delta fs\, dt \qquad (4)$$

The detecting circuit 64 calculates the surface roughness of the subject 12, by adding the displacement $\Delta Zs1$ in increments of $\lambda/2$, and the displacement $\Delta Zs2$ in increments of about $\lambda/2000$.

In the instant embodiment as described above, the S-type linearly polarized laser beam Ls of the laser light L is converted by the double-focus lens 76 into parallel rays of light, and the P-type linearly polarized laser beam Lp of the laser light L is converged by the same double-focus lens 76 at the front focal point of the objective lens 44, while the S-type and P-type laser beams Ls, Lp having the common optical axis are propagated along the same optical path. Then, the parallel S-type polarized laser beam Ls as the measuring beam is converged at the reading spot S1 on the surface 18 of the subject 12, while the P-type polarized laser beam Lp once converged by the lens 76 is converted into parallel rays which serve as the reference beam for irradiating the area P1 on the subject surface 18, which area P1 is considerably larger than the reading spot S1 irradiated with the S-type laser beam Ls. Thus, the measuring and reference beams are propagated along the common optical path. This arrangement is contrary to the arrangement of FIG. 3 in which the two linearly polarized laser beams of the laser light L are separated from each other by a beam splitter, and propagated along respective optical paths so as to provide the parallel and converged laser beams. Accordingly, the present surface roughness measuring apparatus does not require a polarizing beam splitter for splitting the laser light L into the two linearly polarized laser beams, and combining the reflected two laser beams with each other, which would reduce the extinction ratio of the measuring beam and accordingly weaken the signal component of the output of the measuring apparatus. Without using such a polarizing beam splitter, the present measuring apparatus has a sufficiently increased signal-to-noise (S/N) ratio.

As described above, the two linearly polarized laser beams, that is, the S-type and P-type laser beams Ls and Lp are propagated along the common optical path. Therefore, even if streams of the atmosphere occur in the common optical path, the two laser beams Ls, Lp are subject to similar influences due to the streams of the atmosphere during their propagation along the common optical path. As a result, the measuring beat signal $F_D$ does not involve noises due to the streams of the atmosphere, since such noises included in the measuring and reference laser beams are counterbalanced with each other when the measuring beat signal $F_D$ is produced by interference between the two laser beams. Accordingly, the present surface roughness measuring apparatus has further improvements in the S/N ratio and accuracy of measurement of the surface roughness.

While the present invention has been described in its presently preferred embodiment, for illustrative purpose only, it will be understood that the invention may be otherwise embodied.

Figure 4:
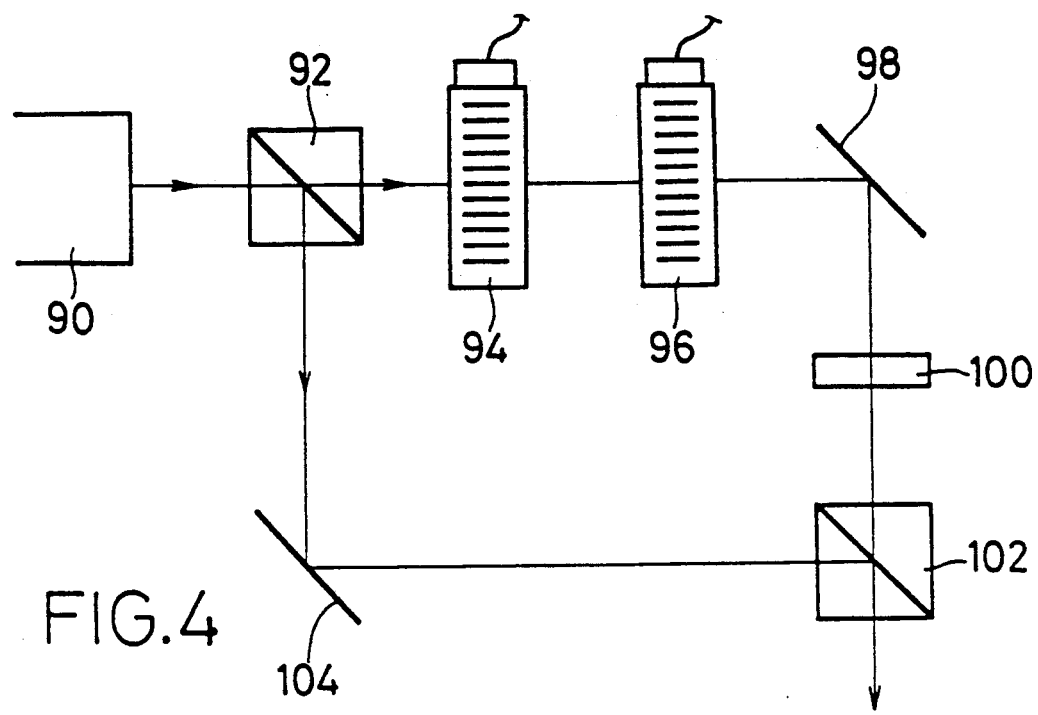
FIG. 4 is a schematic view showing a laser device having an acoustooptical modulator (AOM) for producing two linearly polarized laser beams having different frequencies.

In the illustrated embodiment, the Zeeman-type laser source 30 is used as a laser device for producing two laser beams with two orthogonal planes of polarization and different frequencies. However, the measuring apparatus of the present invention may use a laser device which uses a frequency shifter including an acoustooptic modulator, for producing two linearly polarized laser beams which have a desired difference in frequency. More specifically described with reference to FIG. 4, a laser source 90 is adapted to produce a laser light which is a linearly polarized beam having a certain frequency. The laser light emitted by the laser source 90 is split by a beam splitter 92 into two components, one of which is shifted in frequency by means of an acoustooptic modulator (AOM) consisting of a pair of acoustooptic elements 94, 96, and is consequently incident upon a polarizing beam splitter 102, through a mirror 98 and a λ/2 waveplate 100. The other component of light reflected by the beam splitter 92 is reflected by a mirror 104, and is incident upon the polarizing beam splitter 102 in which the two components of light are recombined with each other. Since the above-indicated one component passing through the acoustooptical modulator (94, 96) is shifted in frequency, with its polarization plane being rotated 90° by the λ/2 waveplate 100, the combined laser light from the polarizing beam splitter 102 is composed of two orthogonally-polarized beams having different frequencies. In this case, it is possible to use a drive frequency signal of the acoustooptic modulator, for obtaining the reference beat signal $F_B$.

Although the subject 12 is movable in both X-axis and Y-axis directions while being mounted on the X-Y table 60, the subject may be mounted on a table which is moved in only one of the X-axis and Y-axis directions.

In the illustrated embodiment, the S-type linearly polarized laser beam Ls and the P-type linearly polarized laser beam Lp serve as the measuring beam and the reference beam, respectively. However, the S-type and P-type laser beams may serve as the reference and measuring beams, respectively, if the optical axis of the double-focus lens 76 is rotated by 90 degrees around the optic axis of the laser light L.

Figure 5:
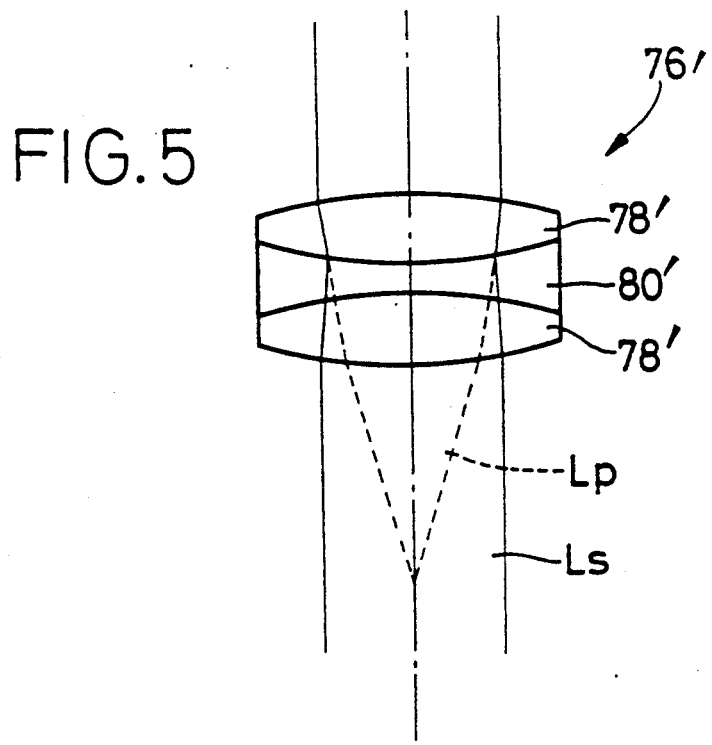
FIG. 5 is a view illustrating a double-focus lens of a type different from that of FIG. 2.

In the illustrated embodiment, the double-focus lens 76 consists of the first convex lens 78 formed of an ordinary optical glass, and the second concave lens formed of a birefringent material. However, the measuring apparatus of the present invention may use a double-focus lens 76' as shown in FIG. 5, which consists of a pair of convex lenses 78', and a concave lens 80' formed of a birefringent material. The concave lens 80' has opposite concave surfaces on which the convex lenses 78', 78' are respectively disposed, in the direction of the above-indicated common optic axis of the two laser beams. Further, the double-focus lens 76 may be constructed such that the positions of the first and second lenses 78, 80 are reversed in the direction parallel to the optical path, with respect to those of the illustrated embodiment. Moreover, the double-focus lens 76 may consist of three or more lenses which are superposed on each other. In addition, the second lens 80 of the double-focus lens 76 may be formed of biaxial crystal of orthorhombic system, monoclinic system or triclinic system, for example, as well as uniaxial crystal of trigonal system, tetragonal system, or hexagonal system, for example. In essence, the double-focus lens 76 may be constructed in any manner and formed of any material provided that the lens 76 is capable of converting one of the two linearly polarized laser beams of the laser light L into parallel rays of light and converging the other linearly polarized laser beam.

It will be understood that the present invention may be embodied with various other changes, modifications and improvements, which may occur to those skilled in the art, without departing from the spirit and scope of the invention defined in the following claims.

What is claimed is:

1. An optical surface roughness measuring apparatus for measuring roughness of a surface of a subject, by irradiating the surface with two linearly polarized beams of light which have orthogonal planes of polarization and different frequencies, and detecting a change in a beat frequency of said two beams reflected by said surface, comprising:

a laser device for producing two linearly polarized laser beams as said two linearly polarized beams; and an optical device having a single optical path between said laser device and said surface of the subject, so that said two linearly polarized laser beams are propagated from said laser device toward said surface along said single optical path, said optical device including a double-focus lens and being operable for converging one of said two laser beams so as to irradiate a reading spot on the surface of said subject, and converting the other of said two laser beams into parallel rays of light for irradiating an area on said surface, said area being aligned with said reading spot and having a diameter larger than said reading spot.

2. An optical surface roughness measuring apparatus according to claim 1, wherein said double-focus lens comprises a concave lens formed of a birefringent material.

3. An optical surface roughness measuring apparatus according to claim 2, wherein said concave lens is formed of uniaxial crystal.

4. An optical surface roughness measuring apparatus according to claim 2, wherein said double-focus lens further comprises a convex lens which is superposed on said concave lens in a direction parallel to said optical axis, said convex lens and said concave lens cooperating with each other to convert said two linearly polarized lazer beams into a parallel beam and a converged beam, respectively.

5. An optical surface roughness measuring apparatus according to claim 4, wherein said optical device further includes an objective lens disposed between said double-focus lens and said surface of the subject, for converging said parallel beam from said double-focus lens so as to irradiate said reading spot on said surface, and converting said converged beam from said double-focus lens into said parallel rays of light so as to irradiate said area on said surface.

6. An optical surface roughness measuring apparatus according to claim 1, wherein said double-focus lens consists of a pair of convex lenses, and a concave lens formed of a birefringent material, said concave lens having opposite concave surfaces on which said pair of convex lenses are disposed, respectively, said pair of convex lenses and said concave lens cooperating with each other to convert said two linearly polarized laser beams into a parallel beam and a converged beam, respectively.

7. An optical surface roughness measuring apparatus according to claim 6, wherein said optical device further includes an objective lens disposed between said double-focus lens and said surface of the subject, for converging said parallel beam from said double-focus lens so as to irradiate said reading spot on said surface, and converting said converged beam from said double-focus lens into said parallel rays of light so as to irradiate said area on said surface.

8. An optical surface roughness measuring apparatus according to claim 1, wherein said optical device further includes a beam expander disposed between said laser device and said double-focus lens, for converting said two laser beams into respective parallel beams which are incident upon said double-focus lens.

9. An optical surface roughness measuring apparatus according to claim 8, wherein said beam expander comprises two convex lenses which are disposed on said single optical path.

10. An optical surface roughness measuring apparatus according to claim 1, wherein said laser device comprises a Zeeman-type laser source which produces two laser beams having orthogonal planes of polarization and different frequencies.

11. An optical surface roughness measuring apparatus according to claim 1, wherein said laser device comprises a laser source which produces a laser beam having a first frequency, said laser device including an acoustooptic modulator for shifting said first frequency of the laser beam into a second frequency.

12. An optical surface roughness measuring apparatus according to claim 1, further comprising: a reference photosensor receiving said two linearly polarized laser beams from said laser device, and producing a reference beat signal; a measuring photosensor receiving said two laser beams reflected by said reading spot and said area of said surface of the subject as a measuring and a reference beam, respectively, and producing a measuring beat signal; and a detecting circuit receiving said reference and measuring beat signals, and calculating said roughness of the subject based on the received beat signals.

13. An optical surface roughness measuring apparatus according to claim 12, wherein said detecting circuit calculates a first amount of displacement of said surface of the subject at said reading spot during a movement of said subject in a direction perpendicular to a direction of said displacement, based on a difference between counts of pulses of said reference and measuring beat signals, said first amount being measured in increments of a half of a wavelength of said laser beams, said detecting circuit further calculating a second amount of displacement of said surface during said movement, based on a count of clock pulses for a time duration corresponding to a phase difference between said reference and measuring beat signals, said second amount of displacement being measured in increments of not larger than said half of said wavelength, said detecting circuit adding said first and second amounts of displacement, and eventually determining said roughness of the surface of said subject, based on a sum of said first and second amounts.

14. An optical surface roughness measuring apparatus according to claim 13, further comprising an X-Y table for moving said subject in an X-Y plane relative to said optical device, said first and second displacements occurring in a Z-axis direction perpendicular to said X-Y plane.

* * * * *